Figure 1:
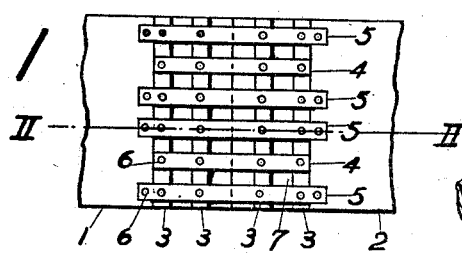

Nov. 9, 1926.                J. HOHL                1,605,950
                         BELT FASTENER
                       Filed Feb. 9, 1924

INVENTOR
John Hohl
BY Lyman E. Dodge
ATTORNEY

Patented Nov. 9, 1926.

1,605,950

UNITED STATES PATENT OFFICE.

JOHN HOHL, OF BROOKLYN, NEW YORK.

BELT FASTENER.

Application filed February 9, 1924. Serial No. 691,564.

This invention relates to fastening or connecting means and particularly to a fastening or connecting means for holding firmly together the free ends of a ribbon or belt. At the present time belts, sometimes of great length, are employed as a means for conveying material. These belts in their course pass over a driving pulley and an idle pulley positioned perhaps at some considerable distance therefrom and intermediate these pulleys are positioned guiding, supporting, or what might be called belt channel forming pulleys or rolls. As the belts used as conveyors are sometimes of great length it is necessary to support the intermediate portion of the belt between the driving pulley and the idle pulley as is obvious. In order to have the conveyer belt properly transport certain kinds of material it is necessary to cause the belt to assume somewhat the form of a channel as is well known in the art. In order to form these channels, rolls or pulleys are placed adjacent each edge of the belt and inclined at an angle thereto so as to cause the edges of the belt to turn upwardly and inwardly so as to form the belt somewhat as a channel. As the conveyor belts are often of great thickness due to the large weights which it is necessary for them to transport, they are by reason of their size alone of great weight and consequently in order to connect the ends of the belt, it has heretofore been necessary to employ such very firm and rigid structures as iron plates placed both above and below the belt and riveted through and through. Such connection introduces difficulties in that it does not allow the belt to properly flex at the joints so as to assume the channel-like form and furthermore in passing over a driving pulley the adhesion of the plates is not as great as that of the belt fabric itself and consequently objectionable slipping is experienced and furthermore the belt cannot conform suitably to the curvature of the pulleys so that an undue strain is placed on the belt which tends to rapid deterioration of the belt.

The principal object of applicant's invention is to provide a fastener or connecting means for the ends of belts especially large, heavy conveyor belts which will while providing the proper tensile strength also allow the belt or conveyor to be properly flexed when passing the belt, channel forming guides or rollers and will also be so constructed that adhesion of the belt to the driving pulley will not be materially lessened when the joint passes over the driving pulley.

Other objects and advantages will appear as the description of the particular physical embodiment selected to illustrate the invention progresses, and the novel features of the invention will be particularly pointed out in the appended claims.

Figure 7:
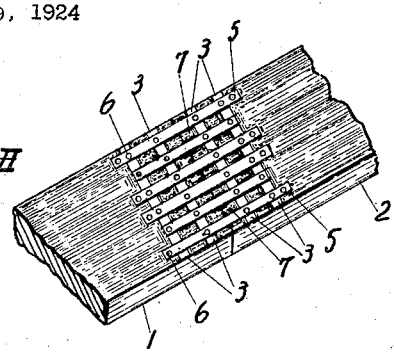
Figure 2:
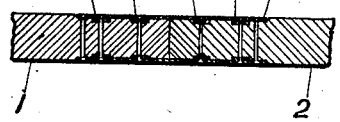
Figure 3:
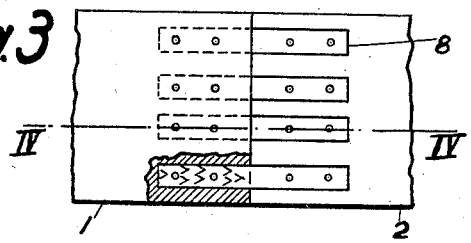
Figure 4:
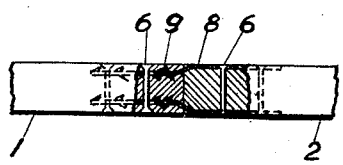
Figure 6:
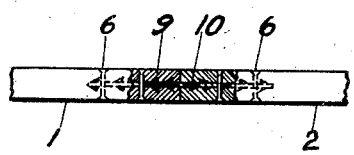
Figure 5:
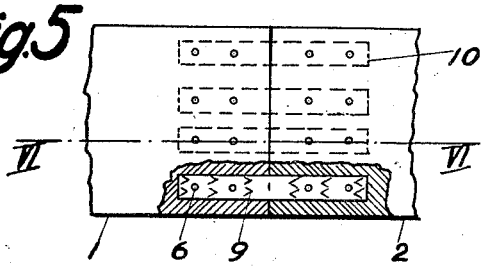

In describing the invention in detail, and the particular physical embodiments selected to illustrate the invention, reference is had to the accompanying drawing, wherein I have illustrated particular preferred physical embodiments of my invention, and wherein like characters of reference designate corresponding parts throughout the several views, and in which:

Figure 1 is a top plan view of a fragment of belt illustrating my invention as used for connecting the ends thereof; Fig. 2, is an elevational cross sectional view on the plane indicated by the line II—II of Fig. 1; Fig. 3, is a top plan view of a fragment of a belt, with certain parts broken away to more clearly show the construction with the ends thereof fastened together by a modified form of my invention; Fig. 4, is a view partly in elevation and partly in cross section on the plane indicated by the line IV—IV of Fig. 3; Fig. 5 is a top plan view of a fragment of a belt with certain parts broken away to more clearly show the construction, having the ends thereof connected by another modified form of my invention; Fig. 6, is a partly elevational and partly cross sectional view on the line VI—VI of Fig. 5; Fig. 7, is a somewhat exaggerated perspective view of the form shown in Fig. 1.

In the drawings numeral 1 designates one end of a belt and 2 the other end thereof.

In order to fasten and connect the ends 1 and 2 of the belt, applicant employs, in the form shown by Figs. 1 and 2 transverse strips 3 and longitudinal strips 4 and 5, all as best shown in Fig. 1.

The tranverse strips 3 and the longitudinal strips 4 and 5 are fastened to each other and to the belt ends 1 and 2 preferably by means of rivets as 6. These rivets are preferably countersunk rivets so that when they have been passed through a belt end and through the strips and thoroughly upset no portion of them extends beyond the surface of a strip.

As will be seen especially by Fig. 2, the lattice like structure shown by Fig. 1 is placed both above and below the meeting ends of the belt and the rivets pass through a belt end and also through strips both above and below the belt. In some cases the rivets pass through top and bottom longitudinal strips while in other cases the rivets pass both through top and bottom longitudinal strips and also through top and bottom transverse strips. This construction arises from the fact that in some cases it is preferred that the joint possess more strength by having the ends of some of the longitudinal strips as 5 carried beyond the point of connection of the other strips so that somewhat the effect of staggering of the rivets is obtained.

The strips 3 and the strips 4 and 5 are preferably made of relatively thin spring metal preferably spring steel so that when the rivets as 6 are drawn tightly by upseting all of the strips sink into the fabric of the belt and cause the material in the small squares as 7 between the strips to project beyond the surface of the strips and likewise cause the material outside of and beyond the strips to project beyond the surface of the strips all as best shown somewhat exaggerated, in the perspective view Fig. 7. This feature of construction, that is, the sinking of the strips into the fabric of the belt is applicant's preferred form and method of using the invention but it will be obvious that many of the advantages of applicant's invention may be obtained even if the strips as 3 and 4 and 5 are not so sunk in the fabric of the belt that their surface will not come in contact with a driving pulley.

From the construction as described it will now be obvious that applicant has devised a belt fastener or connector which reduces but slightly the adhesive properties of the belt when passing over a driving pulley, as from the description hereinbefore set forth, it will be readily seen that the fabric of the belt adjacent the connector may come in contact with and adhere to the driving pulley. It will also be observed that the belt when completely connected is practically as flexible either transversely or longitudinally as before being connected. The strips 3 are spaced a distance apart such that the flexibility of the belt is not interferred with as it may bend beyond the strips and between the strips and the strips being relatively narrow this bending is not in any way interfered with so that the belt in passing around the driving pulley will conform to the periphery thereof. The belt may bend transversely readily, because the strips 4 and 5 are positioned a sufficient distance apart to enable this bending to take place and being comparatively narrow they do not interfere with the bending, and furthermore the strips 3 being of thin spring metal do not materially interfere with the transverse bending or flexing of the belt.

A long heavy conveyor belt having its ends connected by a device constructed in accordance with applicant's invention as hereinbefore described, will pass readily over the driving pulley bending to conform with the curvature thereof and will not slip as the fabric of the belt is presented to the surface of the belt in and about the connector and the connector itself in the preferred form is kept away from the surface of the driving pulley by being sunk in the material of the belt. The belt will furthermore bend or flex to form an approximate channel when passing the guiding and channel forming pulleys hereinbefore mentioned and commonly used with conveyor belts.

Fig. 3 shows a modified form of applicant's invention. In this form it is contemplated that the longitudinal strips as 8 will be positioned intermediate the outer surfaces of the belt either at the time of manufacturing the belt in the factory or perhaps before leaving the factory by splitting the belt after being manufactured or may perhaps be inserted at the point of use of the belt. This form is however peculiarly adapted to be used where it is desired to build the connector into the belt at the factory. The strips 8 as shown especially by Fig. 4 are buried intermediate the surface of one end 1 of the belt and positioned on the outer surface of the other end 2 of the belt. In the form as shown by Figs. 3 and 4 the longitudinal strips are held to the end 2 by the rivets 6 just as in form shown by Figs. 1 and 2 and the other ends of the fasteners are held to the other end 1 of the belt by similar rivets as 6 which rivets are assisted in holding the end 1 and the strips 8 together by the punched protuberances 9.

Figs. 5 and 6 show still another form of fastening. This form of fastening is perhaps the best preferred form and is peculiarly adapted for fastening the ends of belts together where this is done at a factory where suitable appliances for making the very best joint may be at hand. In the form shown by Figs. 5 and 6 the longitudinal strips 10 are positioned intermediate the top and bottom surface of both the ends 1 and 2 of the belt and assisted preferably by protuberances 9 are fastened to the ends by the rivets as 6. This form of fastening as shown by Figs. 4 and 5 readily lends itself to the making of a perfect joint because the longitudinal strips 10 may be inserted as shown during the manufacture of the belt and if it is a socalled, rubber belt they may be in position and remain in position while the belt, if a socalled rubber belt, is being vulcanized so that a most perfect joint is made.

If the form of connection as shown by Figs. 5 and 6 is desired to be made at the place where the belt is to be used, then the belt is split along the medium line, the strips 10 inserted and then before riveting the parts of the belt are smeared with some form of cement suitable for the purpose so that when the joint is completed it is exceptionally strong. In the case of a rubber belt when the form as shown by Figs. 5 and 6 is used after the belt ends are split and the connectors inserted a suitable material may be placed between the split ends of the belt and then after riveting the connectors in place this material may be vulcanized by the application of a proper heat.

Although I have particularly described the construction of certain physical embodiments of my invention, and explained the operation and principle thereof, nevertheless, I desire to have it understood that the forms selected are merely illustrative, but do not exhaust the possible physical embodiments of the idea of means underlying my invention.

What I claim as new and desire to secure by Letters Patent of the United States is:

1. In a belt connector the combination of spaced longitudinal and transverse strips on both sides of the belt riveted together and drawn into the fabric of the belt so as to be virtually beneath the surface thereof.

2. In a belt fastener the combination of a plurality of transverse strips on one end of the belt and a plurality of transverse strips on the other end thereof and longitudinal strips extending from one end onto the other end and means fastening the strips together and to the ends.

3. In a belt fastener the combination of a transverse strip on one belt end and a transverse strip on the other belt end and a plurality of longitudinal strips extending from the one transverse strip to the other transverse strip and means attaching each transverse strip to the end of the belt upon which it is positioned and to each of the longitudinal strips.

4. In a belt fastener the combination of spaced transverse strips on each end of the belt and spaced longitudinal strips extending between the transverse strips and means attaching the transverse strips on one belt end to that belt end and to the longitudinal strips and means fastening the other transverse strips to the other belt end and to the longitudinal strips.

5. In a belt fastener the combination of spaced spring steel transverse strips positioned some on one belt end and others on the adjacent belt end with spaced longitudinal spring steel strips extending between the transverse strips and means attaching the transverse strips to their respective belt ends and to the longitudinal strips.

6. In a belt fastener the combination of easily flexible transverse strips on one belt end and easily flexible transverse strips on the other belt end together with spaced easily flexible longitudinal strips extending therebetween and means fastening the longitudinal strips and some transverse strips to one belt end and means fastening the other transverse strips and the longitudinal strips to the other belt end.

7. In a belt fastener a lattice work structure made of spring metal extending from one belt end to another belt end and means for fastening the lattice work structure to each of the belt ends and for drawing the same into the fabric of the belt so that the adhesive properties of the belt are not materially decreased.

JOHN HOHL.